June 18, 1957   H. E. WALTER ET AL   2,796,351
METHOD OF MANUFACTURING CHEESE
Filed June 11, 1953
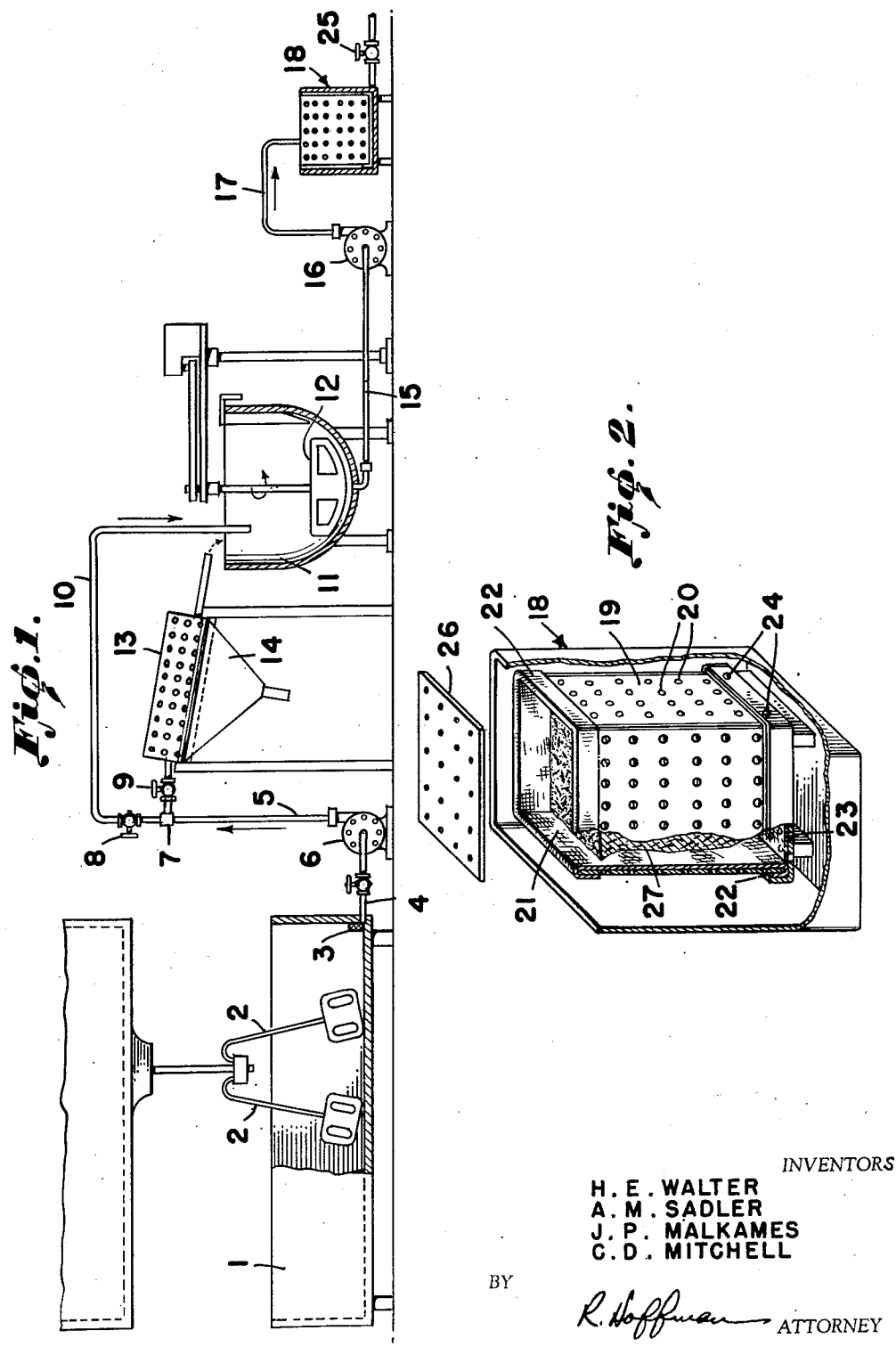
INVENTORS
H. E. WALTER
A. M. SADLER
J. P. MALKAMES
C. D. MITCHELL
BY
R. Hoffman  ATTORNEY

2,796,351

METHOD OF MANUFACTURING CHEESE

Homer E. Walter, Takoma Park, Arthur M. Sadler, College Park, James P. Malkames, Silver Spring, and Clair D. Mitchell, Hyattsville, Md.; dedicated to the free use of the People in the territory of the United States Application June 11, 1953, Serial No. 361,093

6 Claims. (Cl. 99—116)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

We hereby dedicate the invention herein described to the free use of the people in the territory of the United States to take effect on the granting of a patent to us.

This invention relates to the production of cheese and more particularly to the process of manufacturing hard and semisoft types, ripened without gas holes, such as Cheddar, granular, Colby, Monterey and Asiago fresh cheese, which contain usually 35 to 45 percent moisture and not less than 50 percent butterfat in the solids.

Production of the above-mentioned cheeses involves the coagulation of casein in the milk and the separation and expulsion of whey. This is accomplished by the addition of a milk starter, composed of lactic-acid-producing bacteria, primarily mixed strains of Streptococcus lactis and Streptococcus cremoris and the enzyme rennin, in the form of commercial liquid rennet. Modification of the curd to obtain different types of cheese is accomplished by a number of different treatments such as cooking temperatures, matting, turning slabs of curd, addition of water to cut, cooked curd, dry salting before pressing, or brine salting after pressing. Characteristics of the cheese such as taste, salt, moisture content, and appearance are determined by the type of treatment given the curd.

However, the S. lactis and S. cremoris used in the conventional method are neither heat nor salt tolerant organisms, and are added for the specific purpose of producing acid while the milk and curd are at temperatures of 86° to 104° F., and to a limited extent after the curd has cooled during the first few days of curing.

One object of this invention is to decrease the length of manufacturing time.

Another object of this invention is to improve the body and texture of the cheese.

A further object of this invention is to increase and improve the amount of flavor in the cheese.

A still further object of this invention is to reduce the amount of labor required and to increase the mechanization of the process.

Another object of this invention is to reduce the manufacturing costs.

One more object of this invention is to increase the rate of cheese ripening.

Yet another object of this invention is to increase the yield of cheese.

Still another object of this invention is to utilize the same equipment several times within the same work day.

Other objects and advantages of this invention will be apparent from the description which follows.

According to our invention an additional starter culture of the lactic-acid-producing streptococcus, S. durans, which is known to be both heat tolerant, and salt tolerant is used to produce acid under conditions which are inhibitory to the organisms S. lactis and S. cremoris which are customarily used. In our invention the starter S. lactis and S. cremoris is used to develop acid until the ultimate desired temperature of the curd and whey inhibits or inactivates them. At that time, the heat tolerant and salt tolerant lactic-acid-producing S. durans is at its optimum temperature for growth and production of acid.

The invention will now be described in detail, and with reference to the attached drawing.

In the drawing:

Figure 1 is a schematic representation of the apparatus used in the process.

Figure 2 is an enlargement of the tank 18, described below, and showing the details of construction.

In carrying out the new process milk is pumped into a conventional cheese vat 1 equipped with agitator 2 and a steam jacket (not shown). To this milk are then added the starter cultures which are the lactic acid producing streptococci, and the milk is permitted to ripen. After ripening, rennet is added to coagulate the contents of the vat. When the milk has properly coagulated it is cut into small cubes. A screen 3 is then placed over the outlet 4 of vat 1. This screen serves to retain the curd in the vat while a portion of the whey only is transferred to line 5 by means of pump 6. At point 7, line 5 branches into two legs, each supplied with valves 8 and 9, respectively. During the step when the screen 3 is in place and only whey is being pumped from vat 1, valve 8 is open and valve 9 is closed, causing the pumped whey to be transferred through line 10 directly into tank 11, which is equipped with stirrer 12. When the desired amount of whey has been pumped into tank 11, screen 3 is removed, valve 8 is closed, and valve 9 is opened, causing the curd and the remaining whey from vat 1 to be pumped into revolving perforated cylindrical drum 13. The perforations in the drum 13 are preferably ⅛ inch in diameter, approximately 70 holes per square inch. The drum is approximately 22 inches long and 8¾ inches in diameter; and is supported and driven in such a manner as to regulate the pitch and rotation speed which will result in determining the time the curd is retained, and at the same time separating the whey from the curd. The whey falling through the perforations into receptacle 14 is available for further processing. The curd is tumbled in the revolving drum 13 and falls out by gravity from the lower end into tank 11.

Subsequent to the processing of the curd and whey in tank 11, as will be more fully described below, the contents of tank 11 are transferred through lines 15 and 17 to tank 18 by means of pump 16. In tank 18 is a rectangular cheese hoop 19, preferably of stainless steel, that is open at top and bottom. In a preferred form, its inside dimensions are 11 inches x 14 inches x 24 inches high. The holes 20 are ¼ inch in diameter and spaced every 2½ inches on center to facilitate drainage of the whey. The hoop 19 is lined on the inside with cheesecloth 21 in such a manner that there is an overlap 22 of about 2 inches at the top and bottom. The hoop 19 is inserted into a cheesecloth-lined bottom 23, perforated in the same way as hoop 19, whose preferred dimensions are 1 inch in depth by 11¼ x 14¼ inches. Hoop 19 is secured in bottom 23 by means of two through pins 24. The lined cheese hoop and bottom are placed in the open top tank 18 that is large enough to allow 2 to 3 inches of space around the hoop 19 and bottom 23. Valve 25 in tank 18 controls the whey level in the tank during the hooping operation.

Upon completion of the hooping operation cheesecloth 21 is folded over the surface of the curd, a weighted perforated metal follower 26 is placed on the inside of the hoop, the whey in tank 18 is withdrawn, the hoop removed, and curd 27 is pressed. Pressing the curd is continued for a few hours, the weighted follower then removed, and the cheese dressed. After the dressing operation pressing is resumed for 16–20 hours. All of the equipment should be of stainless steel construction wherever possible.

In this new process the cooking temperature in tank 1 may vary from 95° F. to as high as 120° F. It may even be cooked to as high as 130° F. if cooled subsequently to 120° F. or below. In the subsequent steps described above, approximately 15 to 20 percent of the contents of vat 1 are first transferred as whey directly to tank 11. The final mixture of curd and whey in tank 11, if not previously heated to the desired temperature, may further be heated to a temperature of from 110° F. to 130° F. When heating to temperatures higher than 120° F., the mixture is subsequently cooled to below 120° F. Sufficient salt is then added to the mixture in tank 11 to insure a final salt content in the finished cheese of 1.3 to 1.7 percent.

The amount of each starter group used may vary from as little as ¼ of 1 percent to as much as 2½ percent, depending on the type of cheese being manufactured. The degree of acid development in the cheese may be controlled by the amount of each starter group used, the temperatures employed and the length of time the curd and whey are held at the optimum temperature of desired bacterial activity.

The body of this cheese is quite firm, and very pliable when young; and becomes very mellow and smooth as it ages. The texture is usually blind, smooth, and quite meaty. More and better flavor develops in a shorter time than in cheese made by conventional methods—due to the type of organisms used and the method of manufacturing and curing.

Our invention will now be described in detail in the following specific examples which illustrate the preferred procedure but do not limit the scope of the invention:

*Example I*

The following is a description of our improved process of manufacturing Cheddar cheese.

Whole milk containing about 4.0 percent butterfat is pasteurized and cooled. 820 pounds of this milk are pumped into a regular 4,000-pound steam-jacketed Cheddar cheese vat. It is heated to 88° F. One and one-half percent *S. lactis* starter and ¾ percent *S. durans* starter are added, and the milk is ripened for 1 hour. After ripening, 96 ml. of rennet is added. When the milk is properly coagulated, usually in 20 minutes, it is cut in cubes with regular ¼-inch curd knives. The cut curd is agitated slowly to prevent serious breakage of the soft particles.

About 20 minutes after cutting, the curd and whey are heated to 100° F. in 30 minutes' time. Stirring the curd and whey continues for an additional 30 minutes. After heating and stirring, about 15 to 20 percent of the contents, as whey, is pumped into a round jacketed tank equipped with a paddle type agitator. The remaining curd and whey are pumped into a perforated revolving cylindrical screen that separates the whey from the curd and the curd falls by gravity into the whey in the round tank.

The total volume of curd and whey in the tank is equal to about ½ the total volume of the original milk. Approximately 2 hours after the addition of rennet, the contents of the tank are heated to 115° F. in 5 minutes and held at this temperature for 8 minutes. After holding for 8 minutes at 115° F., 4 percent salt is added to the curd and whey. The curd and whey is immediately pumped into a rectangular hoop partially submerged in whey as shown in Figure 2. The curd immediately settles through the whey to the bottom of the hoop.

As the pumping is completed, the cheese bandage is folded over the top of the whey and curd on the inside of the hoop. A perforated metal follower 26 and press weights (not shown) of about 20 pounds pressure per square foot are added. The whey surrounding the cheese block is withdrawn, and the curd-filled hoop is removed for pressing. After a few hours the cheese is dressed and then pressed for 16 to 20 hours.

The cheese after pressing may be wrapped or surface dried for paraffining and placed at 55° F. for curing. The cheese at paraffining usually contains approximately 38.0 percent moisture, 31.5 percent butterfat, and 1.4 to 1.6 percent salt.

*Example II*

This example describes our improved method for producing Colby cheese. The operation is the same as described in Example I for Cheddar cheese, up to the point of transfer of the curd and whey from the vat to the tank. In making Colby cheese approximately 150 pounds of water at 115° F. are first placed in tank 11, the entire contents of vat 1 are pumped into the perforated revolving cylinder 13 causing separation of the whey from the curd. The curd falls by gravity into the 115° F. water in tank 11, and is held under agitation at that temperature until sufficiently firm. When sufficient firmness has been obtained, salt is added to the curd and water mixture at the rate of 4%. The salted curd and water are then pumped through the revolving drum, causing separation of the salt water from the salt curd. The latter is permitted to fall by gravity into the dry rectangular hoop.

As the pumping is completed, the cheese bandage is folded over the curd on the inside of the hoop. A perforated metal follower and press weights of about 20 pounds per square foot are added. After a few hours the cheese is dressed and pressing continues for another 16 to 20 hours. The cheese after pressing may be wrapped or surface dried for paraffining and placed at 55° F. for curing. Colby cheese made by this process, at paraffining, contains less than 40 percent moisture, more than 30 percent butterfat, and approximately 1.3 to 1.7 percent salt.

*Example III*

The following is a description of our improved process for the manufacture of Asiago fresh cheese. In our process for the manufacture of Asiago fresh cheese the operation is the same as described for the manufacture of Colby cheese in Example II up to the point of transferring the salted curd and water from the tank except that the perforated, rectangular hoop as shown in Figure 2, is partially submerged in heated water. During the pumping operation the salted curd settles to the bottom of the hoop under water and the excess salted water passes away from the curd through the perforations in the hoop.

As the pumping is completed, the cheese bandage is folded over the top of the water and curd on the inside of the hoop. A perforated metal follower and press weights of about 20 pounds' pressure per square foot are added. The water surrounding the cheese block is withdrawn and the curd-filled hoop is removed for pressing. After a few hours the cheese is dressed and pressed for 16 to 20 hours. After pressing the cheese block may be cut into various sized blocks and wrapped or surface dried for paraffining and stored at 55° F. for curing. Asiago fresh cheese contains less than 45 percent moisture and more than 50 percent fat in the solids.

We claim:

1. A process of manufacturing Cheddar cheese which comprises adding to pasteurized milk a culture of lactic-acid-producing streptococci which do not grow and which do not produce lactic acid at temperatures above 105° F. in salt concentrations of 4% and a culture of *S. durans*, permitting the inoculated milk to ripen, adding rennet to coagulate the milk, cutting the coagulated milk, heating the curd and whey to about from 95° to 105° F., stirring the curd in the heated whey, separating the whey from the curd, remixing the curd with a small portion of the whey, heating the resulting mixture to about from 115° to 118° F., adding 4% salt to the heated mixture, pressing out and draining excess whey, and finally curing the cheese.

2. A process of manufacturing Cheddar cheese which comprises adding to pasteurized milk a culture of lactic-acid-producing streptococci which do not grow and which do not produce lactic acid at temperatures above 105° F. in salt concentrations of 4%, and a culture of *S. durans*, permitting the inoculated milk to ripen, adding rennet to coagulate the milk, cutting the coagulated milk, heating the curd and whey to about from 110° to 130° F., stirring the curd in the heated whey, separating the whey from the curd, remixing the curd with a small portion of the heated whey, adding 4% salt to the mixture of curd and whey, pressing out and draining excess whey, and finally curing the cheese.

3. The precess of claim 1 in which the culture of lactic-acid-producing streptococci which do not grow and which do not produce lactic acid at temperatures above 105° F. in salt concentrations of 4% is *S. lactis*.

4. The process of claim 2 in which the culture of lactic-acid-producing streptococci which do not grow and which do not produce lactic acid at temperatures above 105° F. in salt concentrations of 4% is *S. lactis*.

5. A process of manufacturing Cheddar cheese which comprises adding to pasteurized milk a culture of *S lactis* and a culture of *S. durans,* permitting the inoculated milk to ripen, adding rennet to coagulate the milk, cutting the coagulated milk, heating the curd and whey to about from 95° to 105° F., stirring the curd in the heated whey, separating the whey from the curd, remixing the curd with a small portion of the whey, heating the resulting mixture to about from 115° to 118° F., adding 4% salt to the heated mixture, transferring the heated and salted mixture into a hoop partially submerged in whey, permitting the curd to settle through the whey to form a block of cheese, withdrawing and pressing out the excess whey, and finally curing the pressed cheese.

6. A process of manufacturing Cheddar cheese which comprises adding to pasteurized milk a culture of lactic-acid-producing streptococci which do not grow and which do not produce lactic acid at temperatures above 105° F. in salt concentrations of 4% and a culture of *S. durans*, permitting the inoculated milk to ripen, adding rennet to coagulate the milk, cutting the coagulated milk, heating the curd and whey to about from 110° to 130° F., stirring the curd in the heated whey, separating the whey from the curd, remixing the curd with a small portion of the heated whey, adding 4% salt to the mixture of curd and whey, transferring the salted mixture into a hoop partially submerged in whey, permitting the curd to settle through the whey to form a block of cheese, withdrawing and pressing out the excess whey, and finally curing the cheese.

References Cited in the file of this patent

UNITED STATES PATENTS

| 30,638 | McAllister | Nov. 13, 1860 |
| 1,334,693 | Doane | Mar. 23, 1920 |
| 2,505,984 | Miollis | May 2, 1950 |

OTHER REFERENCES

Bulletin 608, U. S. Dept. of Agriculture Revised February 1932, pages 10–11, 16, 17 and 18.

Chemistry and Industry, July 12, 1947, pages 421–422.

Bergey's Manual of Determinative Bacteriology, 6th ed., 1948, pages 327–328.